United States Patent
Abusleme et al.

(10) Patent No.: US 6,417,279 B2
(45) Date of Patent: *Jul. 9, 2002

(54) THERMOPLASTIC FLUORINATED POLYMERS

(75) Inventors: Julio A. Abusleme, Varese; Claudia Manzoni, Bologna, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/781,218

(22) Filed: Feb. 13, 2001

(30) Foreign Application Priority Data

Feb. 15, 2000 (IT) .......................... MI00A0247

(51) Int. Cl.$^7$ ............................... C08L 27/12
(52) U.S. Cl. ................ 525/199; 526/242; 526/249; 526/250; 526/319; 526/348
(58) Field of Search ................ 525/199; 526/250, 526/249, 319

(56) References Cited

U.S. PATENT DOCUMENTS

| | | |
|---|---|---|
| 4,513,129 A | 4/1985 | Nakagawa et al. |
| 4,789,717 A | 12/1988 | Giannetti et al. |
| 4,864,006 A | 9/1989 | Giannetti et al. |
| 5,021,516 A | 6/1991 | Wheland |
| 5,182,342 A | 1/1993 | Feiring et al. |
| 5,434,229 A | 7/1995 | Abusleme et al. |
| 5,453,477 A | 9/1995 | Oxenrider et al. |
| 5,498,680 A | 3/1996 | Abusleme et al. |
| 5,510,435 A | 4/1996 | Abusleme et al. |
| 5,569,728 A | 10/1996 | Abusleme et al. |
| 6,107,393 A * | 8/2000 | Abusleme .............. 524/545 |

FOREIGN PATENT DOCUMENTS

| | | |
|---|---|---|
| EP | 0 185 242 A2 | 6/1986 |
| EP | 0 186 215 A2 | 7/1986 |
| EP | 0 526 216 A2 | 2/1993 |
| EP | 1 067 145 A1 | 1/2001 |

* cited by examiner

Primary Examiner—Fred Zitomer
(74) Attorney, Agent, or Firm—Arent Fox Kintner Plotkin & Kahn

(57) ABSTRACT

A composition comprising a polymer mixture A of polymers formed by:

(a) from 10 to 70% by moles of ethylene (E), (b) from 30 to 90%, by moles of a fluorinated monomer selected from tetrafluoroethylene (TFE), chlorotrifluoroethylene (CTFE), or mixtures thereof, (c) from 0.1 to 30% by moles, with respect to the total amount of monomers (a) and (b), of one or more acrylic monomers;

characterized in that the polymer mixture A comprises polymer fractions having a different content of the acrylic comonomer such that the elastic modulus at 23° C. (ASTM D1708) of said polymer mixture A is lower than at least 10% of the elastic modulus of a polymer formed by monomers a), b) and c) wherein the polymer fractions have substantially an equal content of the acrylic comonomer.

8 Claims, No Drawings

THERMOPLASTIC FLUORINATED POLYMERS

The present invention relates to thermoprocessable flexible fluorinated polymers.

More specifically the present invention relates to flexible copolymers of ethylene/tetrafluoroethylene (ETFE) and ethylene/chlorotrifluoroethylene (ECTFE), modified with hydrogenated monomers. Said copolymers are used for obtaining sheets, pipes, and manufactured articles, among which flexible cables, i.e. having a low elastic modulus, are preferred. More specifically, for the application of flexible cables, said copolymers must not show a necking at yield on the stress-strain curve, thus avoiding the whitening effect on the bent cable. The whitening effect visually represents the material plastic deformation wherefore this cannot recover any longer the initial state.

Ethylene/tetrafluoroethylene (ETFE) and ethylene/chlorotrifluoroethylene (ECTFE) (co)polymers modified with hydrogenated monomers to which flexibility (low elastic modulus) is conferred by addition of hydrogenated plasticizers, are known in the prior art.

One disadvantage of these plasticized (co)polymers when used in the chemical process industry (CPI) is that the plasticizers can migrate from the polymer polluting the process fluids and reducing the manufactured article flexibility.

In the case of the wire & cable applications, for safety reasons these flexible cables must show a high time to ignition, a low smoke and heat releases when they are subjected to a heat source such as for example in the cone calorimeter (see ASTM E1354 test). However the presence of plasticizers increases the release of smoke and heat when the manufactured article comes into direct contact with the flame. Besides, the presence of plasticizers increases the polymer dielectric constant, which is undesired for cables.

The need was therefore felt to have available flexible ethylene/tetrafluoroethylene (ETFE) and ethylene/chlorotrifluoroethylene (ECTFE) (co)polymers not plasticized.

An object of the present invention is therefore a composition comprising a polymer mixture A of polymers formed by moles:

(a) from 10 to 70%, preferably from 35 to 55%, of ethylene (E),
(b) from 30 to 90%, preferably from 45 to 65%, of a fluorinated monomer selected from tetrafluoroethylene (TFE), chlorotrifluoroethylene (CTFE), or mixtures thereof,
(c) from 0.1 to 30%, preferably from 1 to 15%, with respect to the total amount of monomers (a) and (b), of one or more acrylic monomers of formula:

$$CH_2=CH-CO-O-R_2 \qquad (I)$$

wherein $R_2$ is a linear and/or branched alkyl radical, $C_1-C_{20}$, from 1 to 20 carbon atoms, or cycloalkyl from 3 to 20 carbon atoms, or $R_2$ is H; the $R_2$ radical can optionally contain: heteroatoms preferably Cl, O, N; one or more functional groups preferably selected from OH, COOH, epoxide, ester and ether; and double bonds;

characterized in that the polymer mixture A comprises polymer fractions having a different content of the comonomer of formula (I) such that the elastic modulus at 23° C. (ASTM D1708) of said polymer mixture A is lower than at least 10% of the elastic modulus of a polymer formed by monomers a), b) and c) wherein the polymer fractions have substantially an equal content of the comonomer of formula (I).

The polymer mixture A of the composition of the invention is obtainable by blend. For example at least two polymers A1 and A2 can be mixed comprising the monomers of the invention wherein the comonomer of formula (I) in the copolymer A2 is at least 1.5 times the amount of comonomer of formula (I) in the copolymer A1. The ratio by weight between the copolymers A1/A2 is preferably comprised between 1/9 and 9/1.

Preferably the amount of comonomer of formula (I) in the copolymer A2 is at least 1.75 times the amount of comonomer of formula (I) in the copolymer A1, the ratio by weight between the copolymers A1/A2 being preferably comprised between 1/4 and 4/1.

Still more preferably the composition is characterized in that the amount of comonomer of formula (I) in the copolymer A2 is at least twice the amount of comonomer of formula (I) in the copolymer A1, the ratio by weight between the copolymers A1/A2 being preferably between 3/7 and 7/3.

The blends can directly be obtained in polymerization or by physical mixing. Indeed, the polymer mixture A can be obtained by the synthesis in sequence of the polymer fractions in a single polymerization of the above mentioned monomers a), b) and c).

The acrylic monomers of formula (I) are selected from ethylacrylate, n-butylacrylate, acrylic acid, hydroxyethylacrylate, hydroxypropylacrylate, (hydroxy)ethylhexylacrylate.

Preferably the monomer of formula (I) is n-butyl acrylate.

Preferably the fluorinated monomer b) is chlorotrifluoroethylene (CTFE).

Another object of the present invention is the preparation of the polymer mixture A in polymerization, in which in a conversion range of ethylene equal to 50%, at least 75% by weight of the total amount of the comonomer of formula (I) is added to the reaction medium.

Preferably the process is characterized in that in a conversion range of ethylene equal to 30%, at least 50% by weight of the total amount of the comonomer of formula (I) is added to the reaction medium.

Furthermore preferably after 90% of ethylene conversion, less than 7% by weight of the total amount of the comonomer of formula (I) is added to the reaction medium.

Furthermore still more preferably after 80% of ethylene conversion, less than 7% by weight of the total amount of the comonomer of formula (I) is added to the reaction medium.

This preparation process of the polymer mixture A is a copolymerization of the corresponding monomers in the presence of radical initiators, in suspension in organic medium, in the presence or absence of water, or in aqueous emulsion, at a temperature in the range between −60° and 150° C., preferably between −20° and 100° C., more preferably between −10° and 50° C., and pressures in the range 0.5–100 bar, preferably 5–40 bar.

Among the radical initiators, that can be in particular used are:

(i) bis-acylperoxides of formula $(R_f-CO-O)_2$, wherein $R_f$ is a (per)haloalkyl $C_1-C_{10}$ (see for example EP 185,242 and U.S. Pat. No. 4,513,129), or a perfluoropolyoxyalkylene group (see for example EP 186,215 and U.S. Pat. No. 5,021,516); among them, bis-trichloroacetylperoxide and bis-dichlorofluoroacetylperoxide are particularly preferred (see U.S. Pat. No. 5,569,728);

(ii) dialkylperoxides of formula $(R_H\text{—}O)_2$, wherein $R_H$ is an alkyl $C_1$–$C_{10}$; diterbutylperoxide (DTBP) is particularly preferred;

(iii) hydrosoluble inorganic peroxides, such as ammonium or alkaline metal persulphates or perphosphates; sodium and potassium persulphates are particularly preferred.

(iv) dialkylperoxydicarbonates, wherein the alkyl has from 1 to 8 carbon atoms, such as for example di-n-propyl-peroxydicarbonate and di-isopropyl-peroxydicarbonate (see EP 526,216);

(v) organic or inorganic redox systems, such as ammonium persulphate/sodium sulphite, hydrogen peroxide/aminoiminomethansulphinic acid, terbutylhydroperoxide/metabisulphite (see U.S. Pat. No. 5,453,477).

The molecular weight control of the polymer mixture A can be made by using the telogen activity of the comonomers of formula (I) comparable to that of a conventional chain transfer agent especially at high temperatures, i.e. in the range 20°–100° C., or by using specific chain transfer agents. Among these it can be mentioned: ketones, esters, ethers or aliphatic alcohols having from 3 to 10 carbon atoms; hydrocarbons or halogenated hydrocarbons, having from 1 to 6 carbon atoms; bis(alkyl)carbonates wherein the alkyl has from 1 to 5 carbon atoms; etc. Among them, chloroform and alkyl substituted cyclopentanes, in particular methylcyclopentane, are particularly preferred (see U.S. Pat. No. 5,510,435). The transfer agent is fed to the reactor at the beginning of the reaction, or in a continuous way or batchwise during the polymerization. The amount of the used chain transfer agent can range within rather wide limits, depending on the type of the used monomers, the reaction temperature and the molecular weight requested. Generally, said amount ranges between 0.01 and 30% by weight, preferably between 0.05 and 10% by weight, with respect to the total amount of the monomers fed into the reactor.

The process in aqueous emulsion is carried out in the presence of one or more fluorinated surfactants, among which the most commonly used are those of general formula:

wherein $R_f$ is a (per)fluoroalkyl chain $C_5$–$C_{16}$ or a (per)fluoropolyoxyalkylene chain, $X^-$ is —COO$^-$ or —So$_3^-$, $M^+$ is selected from: $H^+$, $NH_4^+$, an alkaline metal ion. Among them we mention: ammonium and/or sodium perfluoro-octanoate, (per)fluoropolyoxyalkylenes ended with one or more carboxylic groups, etc.

The process in emulsion can be advantageously carried out in the presence of dispersions, emulsions or microemulsions preferably of perfluoropolyoxyalkylenes, according to U.S. Pat. No. 4,789,717 and U.S. Pat. No. 4,864,006, or also of microemulsions of fluoropolyoxyalkylenes having hydrogenated end groups and/or hydrogenated repeating units, according to U.S. Pat. No. 5,498,680 in the name of the Applicant.

It has been found by the Applicant that the preparing process of the polymer mixture A in organic suspension in the presence of water leads to a product that tends to agglomerate making difficult the polymer discharge from the autoclave. Besides, the drying temperature between 100° and 150° C. of the so obtained polymer mixture A, i.e. its post-treatment, cannot be carried out in the conventional plants used for thermoplastic materials, due to the rubber-like behaviour of the polymer mixture A.

It has been surprisingly found by the Applicant a process for preparing the polymer mixture A in organic suspension in the presence of water and of a semicrystalline (co)polymer of the chlorotrifluoroethylene (PCTFE) containing at least 99% by moles of chlorotrifluoroethylene, the complement to 100 being one or more acrylic monomers or fluorinated monomers, these preferably selected from (per)fluoroalkylvinylethers, (per)fluorodioxoles, which allow to obviate the above mentioned drawbacks.

Said PCTFE can be added under the form of powder or latex which coagulates by adding a coagulant in the reaction medium in the presence of the organic and aqueous phase. The coagulating agents of PCTFE are those known in the coagulation of the fluoropolymer latexes, for example aluminum sulphate, nitric acid, hydrochloric acid, calcium chloride. Calcium chloride is preferred. The amount of the coagulants depends on the type of the used coagulant. Amounts in the range 0.001%–30% by weight with respect to the total amount of water in the reaction medium, preferably in the range 0.01%–5% by weight, can be used.

The PCTFE addition under the form of latex at the beginning and/or during the synthesis of the polymer mixture A is preferred. In particular in the addition during the synthesis of the polymer mixture A, the PCTFE latex amount can be suitably fed during the comonomer feeding of formula (I). Preferably the fed PCTFE amount is directly proportional to the fed amount of the comonomer of formula (I).

The PCTFE latex can be obtained by (co)polymerization in aqueous emulsion where the presence of a suitable surfactant is required. The fluorinated surfactants of formula:

are the most commonly used, wherein $R_f$ is a (per)fluoroalkyl chain $C_5$–$C_{16}$ or a (per)fluoropolyoxyalkylene chain, $X^-$ is —COO$^-$ or —SO$_3^-$, $M^+$ is selected from: $H^+$, an alkaline metal ion. Among them we mention: sodium perfluoro-octanoate, (per)fluoropolyoxyalkylenes ended with one or more carboxylic groups, etc.

The process for obtaining the PCTFE latex can be advantageously carried out in the presence of dispersions, emulsions or microemulsions preferably of perfluoropolyoxyalkylenes, according to U.S. Pat. No. 4,789,717 and U.S. Pat. No. 4,864,006, or also of microemulsions of fluoropolyoxyalkylenes having hydrogenated end groups and/or hydrogenated repeating units, according to U.S. Pat. No. 5,498,680.

The preferred process for obtaining the PCTFE latex is characterized by the use of perfluoropolyoxyalkylenes microemulsion according to the European patent application EP 1,067,146 in the name of the Applicant herein incorporated by reference.

In the case of the PCTFE copolymerization in suspension, the reaction medium is formed by an organic phase, to which water is added in order to favour the heat dispersion developed during the reaction. The organic phase can be formed by the monomers themselves, without addition of solvents, or by the monomers dissolved in a suitable organic solvent. Among the solvents we can mention chlorofluorocarbons, such as $CCl_2F_2$ (CFC-12), $CCl_3F$ (CFC-11), $CCl_2FCClF_2$ (CFC-113), $CClF_2CClF_2$ (CFC-114), etc. Since said products have a destroying effect on the ozone present in the stratosphere, alternative products, such as the compounds containing only carbon, fluorine, hydrogen, and optionally oxygen, described in U.S. Pat. No. 5,182,342, have recently been suggested. In particular (per)fluoropolyethers with at least one hydrogenated end group, preferably two, of the —CF$_2$H, —CF$_2$CF$_2$H, —CF(CF$_3$)H type can be used.

As said above, in the synthesis in suspension of the polymer mixture A, optionally in the presence of PCTFE, the reaction medium is formed by an organic phase, to which water is added in order to favour the heat dispersion developed during the reaction. The organic phase can be formed by the monomers themselves, without addition of solvents, or by the monomers dissolved in a suitable organic solvent. Among the solvents we can mention branched chain hydrocarbons described in U.S. Pat. No. 5,434,229, having from 6 to 25 carbon atoms and a ratio between methyl groups and the number of carbon atoms higher than 0.5, such as for example 2,3-dimethylbutane, 2,3-dimethylpentane, 2,2,4-trimethylpentane, 2,2,4,6,6-pentamethylheptane, 2,2,4,4,6-pentamethylheptane, etc., or mixtures thereof. Other conventionally used organic solvents are chlorofluorocarbons, such as CCl$_2$F$_2$ (CFC-12), CCl$_3$F (CFC-11), CCl$_2$FCClF$_2$ (CFC-113), CClF$_2$CClF$_2$ (CFC-114), etc. Since said products have a destroying effect on the ozone present in the stratosphere, alternative products, such as the compounds containing only carbon, fluorine, hydrogen, and optionally oxygen, described in U.S. Pat. No. 5,182,342, have recently been suggested. In particular (per)fluoropolyethers with at least one hydrogenated end group, preferably two, of the —CF$_2$H, —CF$_2$CF$_2$H, —CF(CF$_3$)H type can be used.

The synthesis process of the polymer mixture A in organic suspension in the presence of water and PCTFE leads to obtain a composition comprising from 1% to 75% by weight of PCTFE and from 25% to 99% by weight of the polymer mixture A. Preferably the polymer mixture A is in the range 70–95% by weight of the composition. More preferably the polymer mixture A is in the range 80–90% by weight of the composition.

As said with PCTFE a semicrystalline chlorotrifluoroethylene (co)polymer is meant, containing at least 99% by moles of chlorotrifluoroethylene, being the complement to 100 one or more acrylic or fluorinated monomers. The preferred fluorinated monomers are selected from perfluoroalkylvinylethers, perfluorodioxoles, preferably PCTFE is the CTFE homopolymer. The PCTFE having a Melt Flow Index (MFI) higher than 0.1 g/10' measured at 265° C. and at 10 kg load according to the ASTM D 1238-88 method is still more preferred.

As said the compositions of the present invention show an improved flexibility since they show elastic modulus values lower than those obtained in the prior art at equal content of comonomer of formula (I) uniformly distributed in the polymer.

In summary, this high flexibility of the composition of the present invention not imparted by plasticizers represents a remarkable advantage in the wire and cable industry (e.g. jaketing cables) (better dielectric properties and lower smoke release polymers) and in the CPI industry (e.g. sheets and pipes (permanent flexibility and no contamination of the process fluid).

Some embodiment Examples of the present invention are hereinafter reported, the purpose of which is merely illustrative but not limitative of the scope of the invention itself.

EXAMPLE 1

In an enamelled autoclave equipped with enamelled baffles and enamelled stirrer working at 450 rpm, 6.3 l of demineralized water, 834 g of PCTFE homopolymer latex (containing 160 g of polymer, obtained according to Example 1 of European patent application EP 1,067,146), 8 ml of chloroform and 2.5 kg of chlorotrifluoroethylene were introduced. Then the latex was coagulated under stirring by feeding 350 ml of an aqueous CaCl$_2$ solution at 10% by weight. The reaction temperature was set and maintained at 15° C. Then ethylene was fed up to a pressure of 8.2 absolute bar. In the autoclave the radical initiator was then continuously fed during the whole synthesis of the polymer mixture A, under the form of a solution, maintained at –17° C., of trichloroacetylperoxide (TCAP) in isooctane with titre of 0.10 g TCAP/ml. The pressure was kept constant during the polymerization by continuously feeding ethylene to the reactor up to a consumption of 200 g, introducing the total amount of 213 g of n-butylacrylate (n-BUA) according to the following feeding Table 1: grams of n-BUA as a function of the consumed (converted) grams of ethylene.

TABLE 1

| Ethylene consumption (g) | Fed n-BuA (g) |
| --- | --- |
| From 0 to 10 | 0 |
| From 10 to 20 | 11 |
| From 20 to 30 | 21 |
| From 30 to 40 | 30 |
| From 40 to 50 | 30 |
| From 50 to 60 | 20 |
| From 60 to 70 | 20 |
| From 70 to 80 | 20 |
| From 80 to 90 | 10 |
| From 90 to 100 | 10 |
| From 100 to 110 | 10 |
| From 110 to 120 | 5 |
| From 120 to 130 | 5 |
| From 130 to 140 | 5 |
| From 140 to 150 | 3.5 |
| From 150 to 160 | 3.5 |
| From 160 to 170 | 3.5 |
| From 170 to 180 | 1.8 |
| From 180 to 190 | 1.8 |
| From 190 to 200 | 1.8 |

From the feeding Table 1 it can be observed that the addition of n-butylacrylate is such that:
 between 5 and 55% of ethylene conversion 85% by weight of the total amount of n-butylacrylate is added;
 between 10 and 40% of ethylene conversion 66% by weight of the total amount of n-butylacrylate is added;
 between 80 and 100% of ethylene conversion 4.2% by weight of the total amount of n-butylacrylate is added;
 between 90 and 100% of ethylene conversion 1.7% by weight of the total amount of n-butylacrylate is added.

The polymerization lasted 541 minutes and the total amount of initiator solution was 361 ml.

The polymer composition produced was dried at 120° C. for about 16 hours. The amount of dry product obtained was 1810 g.

During the drying the product doesn't agglomerate. Some properties of said composition are reported in Table 8; they comprise the Melt Flow Index (M.I.) according to the ASTM 3275-89 method at a temperature and weight specified in Table 8. The enthalpy associated to the second melting point ($\Delta H_{mII}$) is determined by differential scanning calorimetry (DSC).

The percentage by weight of PCTFE and polymer mixture A are determined by material balance, the molar composition of the polymer mixture A is determined by carbon elemental analysis and by material balance of the comonomer of formula (I).

In Table 10 the mechanical properties at 23° C. on compression molded specimens, according to the ASTM D1708 method, are also reported.

The polymer composition of this example shows no "necking at yield" in the "stress-strain" curve.

EXAMPLE 2

In an enamelled autoclave equipped with enamelled baffles and enamelled stirrer working at 450 rpm, 7.0 l of demineralized water, 277 g of PCTFE copolymer latex (containing 80 g of copolymer, obtained according to Example 4 of European patent application EP 1,067,145 in the name of the Applicant herein incorporated by reference), 8 ml of chloroform and 2.5 kg of chlorotrifluoroethylene were introduced. Then the latex was coagulated under stirring by feeding 250 ml of an aqueous nitric acid solution obtained by diluting 42 ml of $HNO_3$ at 65% by weight in 208 ml of water. The reaction temperature was set and maintained at 15° C. Then ethylene was fed up to a pressure of 8.2 absolute bar. In the autoclave the radical initiator was then continuously fed during the whole synthesis of the polymer mixture A, under the form of a solution, maintained at −17° C., of trichloroacetylperoxide (TCAP) in isooctane with a titre of 0.12 g TCAP/ml. The pressure was kept constant during the polymerization by continuously feeding ethylene to the reactor up to a consumption of 100 g, introducing the total amount of 105 g of n-butylacrylate (n-BUA) according to the following feeding Table 2: grams of n-BUA as a function of the consumed (converted) grams of ethylene.

TABLE 2

| Ethylene consumption (g) | Fed n-BuA (g) |
| --- | --- |
| From 0 to 5 | 0 |
| From 5 to 10 | 0 |
| From 10 to 15 | 15 |
| From 15 to 20 | 15 |
| From 20 to 25 | 15 |
| From 25 to 30 | 10 |
| From 30 to 35 | 10 |
| From 35 to 40 | 10 |
| From 40 to 45 | 5 |
| From 45 to 50 | 5 |
| From 50 to 55 | 5 |
| From 55 to 60 | 2.4 |
| From 60 to 65 | 2.4 |
| From 65 to 70 | 2.4 |
| From 70 to 75 | 1.8 |
| From 75 to 80 | 1.8 |
| From 80 to 85 | 1.8 |
| From 85 to 90 | 0.8 |
| From 90 to 95 | 0.8 |
| From 95 to 100 | 0.8 |

From the feeding Table 2 it can be observed that the addition of n-butylacrylate is such that:
  between 10 and 60% of ethylene conversion 88% by weight of the total amount of n-butylacrylate is added;
  between 10 and 40% of ethylene conversion 71% by weight of the total amount of n-butylacrylate is added;
  between 80 and 100% of ethylene conversion 4.3% by weight of the total amount of n-butylacrylate is added;
  between 90 and 100% of ethylene conversion 1.7% by weight of the total amount of n-butylacrylate is added.
The polymerization lasted 252 minutes and the total amount of initiator solution was 138 ml.

The polymer composition produced was dried at 120° C. for about 16 hours. The amount of dry product obtained was 976 g.

Some properties of the obtained product are reported in Table 8; they comprise the Melt Flow Index (M.I.) according to the ASTM 3275-89 method at a temperature and weight specified in Table 8. The enthalpy associated to the second melting point ($\Delta H_{mII}$) is determined by differential scanning calorimetry (DSC).

The percentage by weight of PCTFE and polymer mixture A are determined by material balance, the molar composition of the polymer mixture A is determined by carbon elemental analysis and by material balance of the comonomer of formula (I).

In Table 10 the mechanical properties at 23° C. on compression molded specimens, obtained according to the ASTM D1708 method, are also reported.

EXAMPLE 3

In an enamelled autoclave equipped with enamelled baffles and enamelled stirrer working at 450 rpm, 6.7 l of demineralized water, 417 g of PCTFE homopolymer latex (containing 80 g of polymer, obtained according to Example 1 of European patent application EP 1.067.146), 8 ml of chloroform and 2.5 kg of chlorotrifluoroethylene were introduced. Then the latex was coagulated under stirring by feeding 350 ml of an aqueous $CaCl_2$ solution at 10% by weight. The reaction temperature was set and maintained at 15° C. Then ethylene was fed up to a pressure of 8.2 absolute bar. In the autoclave the radical initiator was then continuously fed during the whole synthesis of the polymer mixture A, under the form of a solution, maintained at −17° C., of trichloroacetylperoxide (TCAP) in isooctane with titre of 0.11 g TCAP/ml. The pressure was kept constant during the polymerization by continuously feeding ethylene to the reactor up to a consumption of 200 g, introducing the total amount of 213 g of n-butylacrylate (n-BUA) according to the following feeding Table 3: grams of n-BUA as a function of the consumed (converted) grams of ethylene.

TABLE 3

| Ethylene consumption (g) | Fed n-BuA (g) |
| --- | --- |
| From 0 to 10 | 0 |
| From 10 to 20 | 11 |
| From 20 to 30 | 21 |
| From 30 to 40 | 30 |
| From 40 to 50 | 30 |
| From 50 to 60 | 20 |
| From 60 to 70 | 20 |
| From 70 to 80 | 20 |
| From 80 to 90 | 10 |
| From 90 to 100 | 10 |
| From 100 to 110 | 10 |
| From 110 to 120 | 5 |
| From 120 to 130 | 5 |
| From 130 to 140 | 5 |
| From 140 to 150 | 3.5 |
| From 150 to 160 | 3.5 |
| From 160 to 170 | 3.5 |
| From 170 to 180 | 1.8 |
| From 180 to 190 | 1.8 |
| From 190 to 200 | 1.8 |

From the feeding Table 3 it can be observed that the addition of n-butylacrylate is such that:
  between 5 and 55% of ethylene conversion 85% by weight of the total amount of n-butylacrylate is added;
  between 10 and 40% of ethylene conversion 66% by weight of the total amount of n-butylacrylate is added;
  between 80 and 100% of ethylene conversion 4.2% by weight of the total amount of n-butylacrylate is added;
  between 90 and 100% of ethylene conversion 1.7% by weight of the total amount of n-butylacrylate is added.

The polymerization lasted 473 minutes and the total amount of initiator solution was 320 ml.

The polymer composition produced was dried at 120° C. for about 16 hours. The amount of dry product obtained was 1460 g.

Some properties of the obtained product are reported in Table 8; they comprise the Melt Flow Index (M.I.) according to the ASTM 3275-89 method at a temperature and weight specified in Table 8. The enthalpy associated to the second melting point ($\Delta H_{mII}$) is determined by differential scanning calorimetry (DSC).

The percentage by weight of PCTFE and polymer mixture A are determined by material balance, the molar composition of the polymer mixture A is determined by carbon elemental analysis and by material balance of the comonomer of formula (I).

In Table 10 the mechanical properties at 23° C. on compression molded specimens, according to the ASTM D1708 method, are also reported.

EXAMPLE 4

In an enamelled autoclave equipped with enamelled baffles and enamelled stirrer working at 450 rpm, 6.0 l of demineralized water, 1251 g of PCTFE homopolymer latex (containing 240 g of polymer, obtained according to Example 1 of Europan patent application EP 1,067,146), 8 ml of chloroform and 2.5 kg of chlorotrifluoroethylene were introduced. Then the latex was coagulated under stirring by feeding 100 ml of an aqueous $CaCl_2$ solution at 10% by weight. The reaction temperature was set and maintained at 15° C. Then ethylene was fed up to a pressure of 8.2 absolute bar. In the autoclave the radical initiator was then continuously fed during the whole synthesis of the polymer mixture A, under the form of a solution, maintained at −17° C., of trichloroacetylperoxide (TCAP) in isooctane with titre of 0.11 g TCAP/ml. The pressure was kept constant during the polymerization by continuously feeding ethylene to the reactor up to a consumption of 200 g, introducing the total amount of 213 g of n-butylacrylate (n-BUA) according to the following feeding Table 4: grams of n-BUA as a function of the consumed (converted) grams of ethylene.

TABLE 4

| Ethylene consumption (g) | Fed n-BuA (g) |
| --- | --- |
| From 0 to 10 | 0 |
| From 10 to 20 | 11 |
| From 20 to 30 | 21 |
| From 30 to 40 | 30 |
| From 40 to 50 | 30 |
| From 50 to 60 | 20 |
| From 60 to 70 | 20 |
| From 70 to 80 | 20 |
| From 80 to 90 | 10 |
| From 90 to 100 | 10 |
| From 100 to 110 | 10 |
| From 110 to 120 | 5 |
| From 120 to 130 | 5 |
| From 130 to 140 | 5 |
| From 140 to 150 | 3.5 |
| From 150 to 160 | 3.5 |
| From 160 to 170 | 3.5 |
| From 170 to 180 | 1.8 |
| From 180 to 190 | 1.8 |
| From 190 to 200 | 1.8 |

From the feeding Table 4 it can be observed that the addition of n-butylacrylate is such that:

between 5 and 55% of ethylene conversion 85% by weight of the total amount of n-butylacrylate is added;

between 10 and 40% of ethylene conversion 66% by weight of the total amount of n-butylacrylate is added;

between 80 and 100% of ethylene conversion 4.2% by weight of the total amount of n-butylacrylate is added;

between 90 and 100% of ethylene conversion 1.7% by weight of the total amount of n-butylacrylate is added.

The polymerization lasted 900 minutes and the total amount of initiator solution was 490 ml.

The polymer composition produced was dried at 120° C. for about 16 hours. The amount of dry product obtained was 1815 g.

Some properties of the obtained product are reported in Table 8; they comprise the Melt Flow Index (M.I.) according to the ASTM 3275-89 method at a temperature and weight specified in Table 8. The enthalpy associated to the second melting point ($\Delta H_{mII}$) is determined by differential scanning calorimetry (DSC).

The percentage by weight of PCTFE and polymer mixture A are determined by material balance, the molar composition of the polymer mixture A is determined by carbon elemental analysis and by material balance of the comonomer of formula (I).

In Table 10 the mechanical properties at 23° C. on compression molded specimens, according to the ASTM D1708 method, are also reported.

EXAMPLE 5

In an enamelled autoclave equipped with enamelled baffles and enamelled stirrer working at 450 rpm, 5.9 l of demineralized water, 1240 g of PCTFE homopolymer latex (containing 160 g of polymer, obtained according to comparative Example 2 of European patent application EP 1,067,146), 8 ml of chloroform and 2.5 kg of chlorotrifluoroethylene were introduced. Then the latex was coagulated under stirring by feeding 350 ml of an aqueous $CaCl_2$ solution at 10% by weight. The reaction temperature was set and maintained at 15° C. Then ethylene was fed up to a pressure of 8.2 absolute bar. In the autoclave the radical initiator was then continuously fed during the whole synthesis of the polymer mixture A, under the form of a solution, maintained at −17° C., of trichloroacetylperoxide (TCAP) in isooctane with titre of 0.12 g TCAP/ml. The pressure was kept constant during the polymerization by continuously feeding ethylene to the reactor up to a consumption of 200 g, introducing the total amount of 213 g of n-butylacrylate (n-BUA) according to the following feeding Table 5: grams of n-BUA as a function of the consumed (converted) grams of ethylene.

TABLE 5

| Ethylene conumption (g) | Fed n-BuA (g) |
| --- | --- |
| From 0 to 10 | 0 |
| From 10 to 20 | 11 |
| From 20 to 30 | 21 |
| From 30 to 40 | 30 |
| From 40 to 50 | 30 |
| From 50 to 60 | 20 |
| From 60 to 70 | 20 |
| From 70 to 80 | 20 |
| From 80 to 90 | 10 |
| From 90 to 100 | 10 |
| From 100 to 110 | 10 |
| From 110 to 120 | 5 |
| From 120 to 130 | 5 |
| From 130 to 140 | 5 |
| From 140 to 150 | 3.5 |

TABLE 5-continued

| Ethylene conumption (g) | Fed n-BuA (g) |
|---|---|
| From 150 to 160 | 3.5 |
| From 160 to 170 | 3.5 |
| From 170 to 180 | 1.8 |
| From 180 to 190 | 1.8 |
| From 190 to 200 | 1.8 |

From the feeding Table 5 it can be observed that the addition of n-butylacrylate is such that:

between 5 and 55% of ethylene conversion 85% by weight of the total amount of n-butylacrylate is added;

between 10 and 40% of ethylene conversion 66% by weight of the total amount of n-butylacrylate is added;

between 80 and 100% of ethylene conversion 4.2% by weight of the total amount of n-butylacrylate is added;

between 90 and 100% of ethylene conversion 1.7% by weight of the total amount of n-butylacrylate is added.

The polymerization lasted 685 minutes and the total amount of initiator solution was 468 ml.

The polymer composition produced was dried at 120° C. for about 16 hours. The amount of dry product obtained was 1660 g.

Some properties of the obtained product are reported in Table 8; they comprise the Melt Flow Index (M.I.) according to the ASTM 3275-89 method at a temperature and weight specified in Table 8. The enthalpy associated to the second melting point ($\Delta H_{mII}$) is determined by differential scanning calorimetry (DSC).

The percentage by weight of PCTFE and polymer mixture A are determined by material balance, the molar composition of the polymer mixture A is determined by carbon elemental analysis and by material balance of the comonomer of formula (I).

In Table 10 the mechanical properties at 23° C. on compression molded specimens, obtained according to the ASTM D1708 method, are also reported.

EXAMPLE 6

In an enamelled autoclave equipped with enamelled baffles and enamelled stirrer working at 450 rpm, 6.0 l of demineralized water, 1 liter of an aqueous solution containing 0.7 g of 2-hydroxyethylcellulose (average $M_n$ 90,000), 12 ml of chloroform and 2.0 kg of chlorotrifluoroethylene were introduced. The reaction temperature was set and maintained at 15° C. Then ethylene was fed up to a pressure of 8.2 absolute bar. In the autoclave the radical initiator was then continuously fed during the whole synthesis of the polymer mixture A, under the form of a solution, maintained at −17° C., of trichloroacetylperoxide (TCAP) in isooctane with a titre of 0.11 g TCAP/ml. The pressure was kept constant during the polymerization by continuously feeding ethylene to the reactor up to a consumption of 137 g, introducing the total amount of 87 g of n-butylacrylate (n-BUA) according to the following feeding Table 6: grams of n-BUA as a function of the consumed (converted) grams of ethylene.

TABLE 6

| Ethylene consumption (g) | Fed n-BuA (g) |
|---|---|
| From 0 to 10 | 0 |
| From 10 to 20 | 0 |
| From 20 to 30 | 19 |
| From 30 to 40 | 22 |
| From 40 to 50 | 5.5 |
| From 50 to 60 | 5.5 |
| From 60 to 70 | 2 |
| From 70 to 80 | 15.5 |
| From 80 to 90 | 2 |
| From 90 to 100 | 7 |
| From 100 to 110 | 2 |
| From 110 to 120 | 4 |
| From 120 to 130 | 2 |
| From 130 to 137 | 0.5 |

From the feeding Table 6 it can be observed that the addition of n-butylacrylate is such that:

between 15 and 65% of ethylene conversion 82% by weight of the total amount of n-butylacrylate is added;

between 15 and 45% of ethylene conversion 60% by weight of the total amount of n-butylacrylate is added;

between 80 and 100% of ethylene conversion 7.5% by weight of the total amount of n-butylacrylate is added;

between 90 and 100% of ethylene conversion 2.9% by weight of the total amount of n-butylacrylate is added.

The polymerization lasted 690 minutes and the total amount of initiator solution was 361 ml.

The product was dried at 120° C. for about 16 hours. The amount of dry product obtained was 950 g. During the drying the product agglomerates.

Some properties of said mixture are reported in Table 8; they comprise the Melt Flow Index (M.I.) according to the ASTM 3275-89 method at a temperature and weight specified in Table 8. The enthalpy associated to the second melting point ($\Delta H_{mII}$) is determined by differential scanning calorimetry (DSC); the molar composition of the polymer mixture A is determined by carbon elemental analysis and by material balance of the comonomer of formula (I).

In Table 10 the mechanical properties at 23° C. on compression molded specimens, according to the ASTM D1708 method, are also reported.

EXAMPLE 7

In an enamelled autoclave equipped with enamelled baffles and enamelled stirrer working at 450 rpm, 6.0 l of demineralized water, 1 liter of an aqueous solution containing 0.7 g of sodic salt of carboxymethyl-cellulose (average $M_w$ 90,000), 8 ml of chloroform and 2.0 kg of chlorotrifluoroethylene were introduced. The reaction temperature was set and maintained at 20° C. Then ethylene was fed up to a pressure of 9.3 absolute bar. In the autoclave the radical initiator was then continuously fed during the whole synthesis of the polymer mixture A, under the form of a solution, maintained at −17° C., of trichloroacetylperoxide (TCAP) in isooctane with titre of 0.13 g TCAP/ml. The pressure was kept constant during the polymerization by continuously feeding ethylene to the reactor up to a consumption of 148 g, introducing the total amount of 86 g of n-butylacrylate (n-BUA) according to the following feeding Table 7: grams of n-BUA as a function of the consumed (converted) grams of ethylene.

TABLE 7

| Ethylene consumption (g) | Fed n-BuA (g) |
|---|---|
| From 0 to 10 | 0 |
| From 10 to 20 | 0 |
| From 20 to 30 | 28 |
| From 30 to 40 | 17 |
| From 40 to 50 | 9 |
| From 50 to 60 | 4 |
| From 60 to 70 | 3 |
| From 70 to 80 | 7 |
| From 80 to 90 | 3 |
| From 90 to 100 | 3 |
| From 100 to 110 | 1.7 |
| From 110 to 120 | 3.5 |
| From 120 to 130 | 2 |
| From 130 to 140 | 2.4 |
| From 140 to 148 | 2.4 |

From the feeding Table 7 it can be observed that the addition of n-butylacrylate is such that:

between 14 and 64% of ethylene conversion 82% by weight of the total amount of n-butylacrylate is added;

between 14 and 44% of ethylene conversion 67% by weight of the total amount of n-butylacrylate is added;

between 80 and 100% of ethylene conversion 8% by weight of the total amount of n-butylacrylate is added;

between 90 and 100% of ethylene conversion 5.6% by weight of the total amount of n-butylacrylate is added.

The polymerization lasted 750 minutes and the total amount of initiator solution was 467 ml.

The product was dried at 120° C. for about 16 hours. The amount of dry product obtained was 1075 g.

Some properties of the obtained product are reported in Table 8; they comprise the Melt Flow Index (M.I.) according to the ASTM 3275-89 method at a temperature and weight specified in Table 8. The enthalpy associated to the second melting point ($\Delta H_{mII}$) is determined by differential scanning calorimetry (DSC); the molar composition of the polymer mixture A is determined by carbon elemental analysis and by material balance of the comonomer of formula (I).

In Table 10 the mechanical properties at 23° C. on compression molded specimens, according to the ASTM D1708 method, are also reported.

EXAMPLE 8 COMPARATIVE (COMP)

In an enamelled autoclave equipped with enamelled baffles and enamelled stirrer working at 450 rpm, 5.3 l of demineralized water, 1.7 l of methanol, 20 ml of methylcyclopentane and 2.0 kg of chlorotrifluoroethylene were introduced. The reaction temperature was set and maintained at 15° C. Then ethylene was fed up to a pressure of 8.2 absolute bar. In the autoclave the radical initiator was then continuously fed during the whole synthesis of the polymer under the form of a solution maintained at −17° C., of trichloroacetylperoxide (TCAP) in isooctane with titre of 0.10 g TCAP/ml. The pressure was kept constant during the polymerization by continuously feeding ethylene to the reactor up to a consumption of 200 g, and always in a continuous and constant way 0.5 g of n-butylacrylate was fed for each consumed gram of ethylene, with a total amount of 100 g of n-butylacrylate (n-BUA). The addition of n-butylacrylate is such that:

within 50% of ethylene conversion 50% by weight of the total amount of n-butylacrylate is added;

within 30% of ethylene conversion 30% by weight of the total amount of n-butylacrylate is added;

between 80 and 100% of ethylene conversion 20% by weight of the total amount of n-butylacrylate is added;

between 90 and 100% of ethylene conversion 10% by weight of the total amount of n-butylacrylate is added.

The polymerization lasted 555 minutes and the total amount of initiator solution was 399 ml.

The product was dried at 120° C. for about 16 hours. The amount of dry product obtained was 1205 g.

Some properties of the obtained product are reported in Table 9; they comprise the Melt Flow Index (M.I.) according to the ASTM 3275-89 method at a temperature and weight specified in Table 9; the enthalpy associated to the second melting point ($\Delta H_{mII}$) is determined by differential scanning calorimetry (DSC); the molar composition of the polymer is determined by carbon elemental analysis and by material balance of the comonomer of formula (I).

In Table 10 the mechanical properties at 23° C. on compression molded specimens, according to the ASTM D1708 method, are also reported.

EXAMPLE 9 COMPARATIVE (COMP)

In an enamelled autoclave equipped with enamelled baffles and enamelled stirrer working at 450 rpm, 5.3 l of demineralized water, 1.7 l of methanol, 20 ml of methylcyclopentane and 2.0 kg of chlorotrifluoroethylene were introduced. The reaction temperature was set and maintained at 15° C. Then ethylene was fed up to a pressure of 8.2 absolute bar. In the autoclave the radical initiator was then continuously fed during the whole synthesis of the polymer, under the form of a solution, maintained at −17° C., of trichloroacetylperoxide (TCAP) in isooctane with titre of 0.10 g TCAP/ml. The pressure was kept constant during the polymerization by continuously feeding ethylene to the reactor up to a consumption of 200 g, and always in a continuous and constant way 1 g of n-butylacrylate was fed for each consumend gram of ethylene, with a total amount of 200 g of n-butylacrylate (n-BUA). The addition of n-butylacrylate is such that:

within 50% of ethylene conversion 50% by weight of the total amount of n-butylacrylate is added;

within 30% of ethylene conversion 30% by weight of the total amount of n-butylacrylate is added;

between 80 and 100% of ethylene conversion 20% by weight of the total amount of n-butylacrylate is added;

between 90 and 100% of ethylene conversion 10% by weight of the total amount of n-butylacrylate is added.

The polymerization lasted 735 minutes and the total amount of initiator solution was 446 ml.

The product was dried at 120° C. for about 16 hours. The amount of dry product obtained was 1070 g.

Some properties of the obtained product are reported in Table 9; they comprise the Melt Flow Index (M.I.) according to the ASTM 3275-89 method at a temperature and weight specified in Table 9; the enthalpy associated to the second melting point ($\Delta H_{mII}$) is determined by differential scanning calorimetry (DSC); the molar composition of the polymer obtained by carbon elemental analysis and by material balance of the comonomer of formula (I).

In Table 10 the mechanical properties at 23° C. on compression molded specimens, according to the ASTM D1708 method, are also reported.

TABLE 8

| | | M.I. | Percentage by weight of the polymer composition | | Composition of the polymer mixture A | | |
|---|---|---|---|---|---|---|---|
| Examples | $\Delta H_{mII}$ (cal/g) | 225° C./ 2.16 Kg (g/10') | Polymer mixture A (% by weight) | PCTFE (% by weight) | E (% by moles) | CTFE (% by moles) | n-BUA (% by moles) |
| 1 | 1.6 | 3.5 | 91.2 | 8.8 | 36 | 55 | 9 |
| 2 | 1.5 | 1.6 | 91.8 | 8.2 | 37 | 55 | 8 |
| 3 | 2.0 | 1.1 | 94.5 | 5.5 | 35 | 55 | 10 |
| 4 | 1.7 | 2.6 | 86.8 | 13.2 | 36 | 55 | 9 |
| 5 | 1.0 | 1.7 | 90.4 | 9.6 | 36 | 55 | 9 |
| 6 | 1.8 | 6.3 | 100 | — | 39 | 55 | 6 |
| 7 | 2.6 | 2.7 | 100 | — | 40 | 55 | 5 |

TABLE 9

| | | | Polymer composition | | |
|---|---|---|---|---|---|
| Examples | $\Delta H_{mII}$ (cal/g) | M.I. 225° C./2.16 Kg (g/10') | E (% by moles) | CTFE (% by moles) | n-BUA (% by moles) |
| 8 (comp) | 2.6 | 4.7 | 40 | 55 | 5 |
| 9 (comp) | 1.4 | 8.8 | 36 | 55 | 9 |

TABLE 10

| Examples | 1 | 2 | 3 | 4 | 5 | 6 | 7 | 8 (comp) | 9 (comp) |
|---|---|---|---|---|---|---|---|---|---|
| Butylacrylate amount in the final polymer product (% by moles) | 8.0 | 7.2 | 10.0 | 8.1 | 8.8 | 6.0 | 5.0 | 5.0 | 9.0 |
| Mechanical properties at 23° C. | | | | | | | | | |
| Elastic modulus (MPa) | 329 | 689 | 358 | 311 | 366 | 973 | 890 | 1190 | 828 |
| Yield stress (MPa) | 12.8 | 17.8 | 13.5 | 13.0 | 13.4 | 24.0 | 22.0 | 27.1 | 18 |
| Yield strain (%) | 8.1 | 4.6 | 7.9 | 10.6 | 8.0 | 4.0 | 4.0 | 4.8 | 4.2 |
| Stress at break (MPa) | 27.8 | 37.7 | 21.6 | 25.0 | 22.0 | 40.5 | 38.0 | 34.0 | 32.4 |
| Elongation at break (%) | 201 | 230 | 134 | 173 | 129 | 224 | 230 | 234 | 271 |

What is claimed is:

1. Process for manufacturing wire, cable and jacketing cables, said process comprising obtaining by polymerization a composition comprising a polymer mixture A of polymers formed by moles:

(a) from 10 to 70% of ethylene (E), (b) from 30 to 90% of fluorinated monomer selected among tetrafluoroethylene (TFE), chlorotrifluoroethylene (CTFE), or mixtures thereof;

(c) from 0.1 to 30% with respect to the total amount of monomers (a) and (b), of one or more acrylic monomers of formula:

$$CH_2=CH-CO-O-R_2 \qquad (I)$$

wherein $R_2$ is a linear and/or branched alkyl radical, $C_1$–$C_{20}$, from 1 to 20 carbon atoms, or cycloalkyl from 3 to 20 carbon atoms, or $R_2$ is H; the $R_2$ radical can optionally contain: heteroatoms preferably Cl, O, N; one or more functional groups preferably selected from OH, COOH, epoxide, ester and ether; and double bonds;

wherein the polymer mixture A comprises polymer fractions having a different content of the comonomer of formula (I) such that the elastic modulus at 23° C. (ASTM D1708) of said polymer mixture A is lower than at least 10% of the elastic modulus of a polymer formed by the monomers a), b) and c) whose polymer fractions have a substantially equal content of the comonomer of formula (I); and manufacturing said wire, cable or jacketing cables with the composition.

2. Process for manufacturing plates, pipes, and manufacturing articles for CPI applications, said process comprising obtaining by polymerization a composition comprising a polymer mixture A of polymers formed by moles:

(a) from 10 to 70% of ethylene (E), (b) from 30 to 90% of fluorinated monomer selected among tetrafluoroethylene (TFE), chlorotrifluoroethylene (CTFE), or mixtures thereof;

(c) from 0.1 to 30% with respect to the total amount of monomers (a) and (b), of one or more acrylic monomers of formula:

$$CH_2=CH-CO-O-R_2 \qquad (I)$$

wherein $R_2$ is a linear and/or branched alkyl radical, $C_1$–$C_{20}$, from 1 to 20 carbon atoms, or cycloalkyl from 3 to 20 carbon atoms, or $R_2$ is H; the $R_2$ radical can optionally contain: heteroatoms Cl, O, N; one or more functional groups preferably selected from OH, COOH, epoxide, ester and ether; and double bonds;

wherein the polymer mixture A comprises polymer fractions having a different content of the comonomer of formula (I) such that the elastic modulus at 23° C. (ASTM D1708) of said polymer mixture A is lower than at least 10% of the elastic modulus of a polymer formed by the monomers a), b) and c) whose polymer fractions have a substantially equal content of the comonomer of formula (I); and manufacturing said plates, pipes or manufactured articles with the composition.

3. Wires and cables for CPI prepared according to the process of claim 1.

4. Process for manufacturing wire, cable, and jacketing cables, said process comprising obtaining a composition comprising from 1 to 75% by weight of PCTFE and from 25 to 99% by weight of a polymer mixture A of polymers formed by moles:

(a) from 10 to 70% of ethylene (E);

(b) from 30 to 90% of fluorinated monomer selected among tetrafluoroethylene (TFE), chlorotrifluoroethylene (CTFE), or mixtures thereof;

(c) from 0.1 to 30% with respect to the total amount of monomers (a) and (b), of one or more acrylic monomers of formula:

  (I)

wherein $R_2$ is a linear and/or branched alkyl radical, $C_1$–$C_{20}$, from 1 to 20 carbon atoms, or cycloalkyl from 3 to 20 carbon atoms, or $R_2$ is H; the $R_2$ radical can optionally contain: heteroatoms preferably Cl, O, N; one or more functional groups preferably selected from OH, COOH, epoxide, ester and ether; and double bonds;

wherein the polymer mixture A comprises polymer fractions having a different content of the comonomer of formula (I) such that the elastic modulus at 23° C. (ASTM D1708) of said polymer mixture A is lower than at least 10% of the elastic modulus of a polymer formed by the monomers a), b) and c) whose polymer fractions have a substantially equal content of the comonomer of formula (I); and manufacturing said wire, cable, and jacketing cables with the composition.

5. Process for manufacturing plates, pipes, and manufacturing articles for CIP applications, said process comprising obtaining a composition comprising from 1% to 75% by weight of PCTFE and from 25 to 99% by weight of a polymer A of polymers formed by moles:

(a) from 10 to 70% of ethylene (E), (b) from 30 to 90% of fluorinated monomer selected among tetrafluoroethylene (TFE), chlorotrifluoroethylene (CTFE), or mixtures thereof;

(c) from 0.1 to 30% with respect to the total amount of monomers (a) and (b), of one or more acrylic monomers of formula:

  (I)

wherein $R_2$ is a linear and/or branched alkyl radical, $C_1$–$C_{20}$, from 1 to 20 carbon atoms, or cycloalkyl from 3 to 20 carbon atoms, or $R_2$ is H; the $R_2$ radical can optionally contain: heteroatoms preferably Cl, O, N; one or more functional groups preferably selected from OH, COOH, epoxide, ester and ether; and double bonds;

wherein the polymer mixture A comprises polymer fractions having a different content of the comonomer of formula (I) such that the elastic modulus at 23° C. (ASTM D1708) of said polymer mixture A is lower than at least 10% of the elastic modulus of a polymer formed by the monomers a), b) and c) whose polymer fractions have a substantially equal content of the comonomer of formula (I); and manufacturing said plates, pipes or manufactured articles with the composition.

6. Wire, cable and jacketing cables and plates, pipes and manufactured articles according to claim 4 or 5.

7. Wires and cables according to claim 3, wherein the wire and cables are jacketing cable sand plates.

8. Pipes and manufacturing articles for CPI prepared according to the process of claim 2.

* * * * *